(12) United States Patent
Lo et al.

(10) Patent No.: US 6,256,101 B1
(45) Date of Patent: Jul. 3, 2001

(54) OPEN LOOP FIBER OPTIC GYROSCOPE FOR MEASURING ULTRA-HIGH RATES OF ROTATION

(75) Inventors: Pei-Hwa Lo; James E. Goodwin, both of Ramsey, NJ (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/422,421

(22) Filed: Oct. 21, 1999

(51) Int. Cl.[7] .................................................. G01C 19/72
(52) U.S. Cl. ............................................ 356/460; 356/464
(58) Field of Search ................................... 356/350, 460, 356/462, 463, 464, 466

(56) References Cited

U.S. PATENT DOCUMENTS 5,056,919 * 10/1991 Arditty et al. ........................ 356/350
5,386,290 * 1/1995 Okada ................................. 356/350
5,999,260 * 12/1999 Tazartes et al. ...................... 356/350

* cited by examiner

Primary Examiner—Samuel A. Turner
(74) Attorney, Agent, or Firm—Winston & Strawn

(57) ABSTRACT

A fiber optic gyroscope for measuring a rotation rate of an object. The gyroscope includes a light source for generating a light beam and a bidirectional coupler for receiving and forwarding the light beam. A splitter splits the light beam forwarded from the coupler into a first beam and a second beam. A fiber optic coil receives the first and second beams and a phase modulator adjusts the phase of the first and second beams. A signal processor determines the rotational rate of the gyroscope based on the phase difference between the first and second beams. A drive circuit drives the phase modulator to adjust the phases of the first and second beams if the rotation rate of the gyroscope exceeds a certain threshold.

13 Claims, 3 Drawing Sheets

OPEN LOOP FIBER OPTIC GYROSCOPE FOR MEASURING ULTRA-HIGH RATES OF ROTATION

BACKGROUND

A) Field of the Invention

The present invention relates to an open loop fiber optic gyroscope and more particularly to an open loop fiber optic gyroscope which can measure ultra-high rates of rotation.

B) Background of the Invention

FIG. 1 shows a conventional open loop fiber optic gyroscope 1. The gyroscope 1 includes a light source 3, a bidirectional coupler 5, a splitter 7, a modulator 9, a fiber optic sense coil 11, a detector 13, a signal processor 15 and a phase modulation drive circuit 27.

Operationally, light from the light source 3 passes through the bidirectional coupler 5 to the splitter 7. At the splitter 7, the light is split into two beams 8 and 10. The beam 10 passes through the modulator 9 and travels in a counter-clockwise direction through the fiber optic sense coil 11. The light beam 8 travels in the clockwise direction through the fiber optic sense coil 11 and then passes through the modulator 9.

After passing through the fiber optic coil 11, as is known in the art, the two beams 8 and 10 are recombined by the splitter 7 and then travel back through the bidirectional coupler 5 and to the detector 13. The output of the detector 13 enters signal processor 15, first being amplified by preamplifier 17 and then converted to digital format by the A/D converter 19.

The output of the A/D converter 19 is demodulated by demodulator 21 and then averaged by signal processor 23. The output of the signal processor 23 is then forwarded output processor 25. It is the signal processor 15 which, in accordance with the techniques described below, calculates the rotation rate of the gyroscope.

The output of the detector 13 represents the intensity of beams 8 and 10 after being recombined by the splitter 7. The signal processor 15 compares the measured intensity of the recombined beams to an interference curve, which is illustrated in FIG. 2, to determine the phase difference between the beams.

As is known in the art, the phase difference between the beams 8 and 10 is proportional to the rotation rate of the gyroscope 1. Thus, if the phase difference between beams 8 and 10 is known, the rotation rate of the gyroscope 1 can be computed.

Referring to FIG. 2, when the rotation rate of the gyroscope is zero, the output of the detector 13 rests at point X on the curve which means that no phase shift exists. When a rotation rate is applied to the gyroscope 1, the output of the detector 13 moves in one direction or the other depending on the direction in which the gyroscope is rotating. For example, if the gyroscope 1 is rotating in the clockwise direction, the output of the detector shifts in a direction toward point A on the curve. Alternatively, if the gyroscope 1 is rotating in the counterclockwise direction, the output of the detector shifts in a direction toward point B on the curve. This phenomenon is referred to in the art as either a rate induced phase shift or Sagnac phase shift.

Since the slope of the interference curve is relatively flat at point X, the sensitivity of the curve at this region to changes in phase shift is low. As such, small directional movements of the rotational rate along this region of the interference curve can not be accurately measured.

To improve the sensitivity and provide a technique for detecting small changes in phase shift, the phases of the beams 8 and 10 of gyroscope 1 are shifted to allow measurements to occur at points A and B on the interference curve. This technique is referred to in the art as phase modulation.

Phase modulation is accomplished by modulating the phase of beams 8 and 10 to allow measurements of the recombined beam to occur at points A and B. The modulator 9 and phase modulation drive circuit 27 shown in FIG. 1 are the devices which perform the phase modulation.

The phase modulation drive circuit 27 contains a square wave generator 31 and amplifier 29. The generator 31 produces a square wave signal which directs the amplifier 29 to apply signals A and B to the modulator 9. When signal A is applied to the modulator 9, the phases of beams 8 and 10 which pass through the modulator, are adjusted such that the output of the detector 13 is measured at or near the region A of the interference curve. Similarly, when signal B is applied to the modulator 9, the phases of beams 8 and 10 which pass through the modulator, are adjusted such that the output of the detector 13 is measured at or near region B of the interference curve.

As is known in the art, the measurement obtained at or near region B of the curve is then subtracted from the measurement obtained near region A of the curve. This calculated difference is then used to determine changes in rotational rate of the gyroscope 1.

While the conventional gyroscope described above allows for measurements to occur at the more sensitive points on the interference curve, it still has significant drawbacks. In particular, the conventional gyroscope does not have the capability of accurately measuring high rates of rotation which induce Sagnac phase shifts in the range of 90°.

For example, if the conventional gyroscope 1 were to rotate in the clockwise direction at a very high speed and in turn induce a Sagnac shift in the range of 90°, the output of the detector 13 would shift in a direction toward point D on the interference curve given the enormity of the rate induced phase shift. When this occurs, the signal processor 15 cannot distinguish between rotations occurring at points B and D and, as such produces a false reading. Similar errors occur if the output of the detector occurs at point C on the interference curve.

In view of the foregoing, if the conventional gyroscope is placed on an object which at points during its flight has speeds of rotation which induce Sagnac phase shifts in the range of 90°, the gyroscope 100 will produce false readings. In view of this problem, there currently exists a need for a gyroscope that can measure ultra-high rates of rotation.

SUMMARY OF THE INVENTION

It is accordingly an object of the present invention to provide a gyroscope that can measure ultra-high rates of rotation.

It is another object of the invention to provide a gyroscope that can measure ultra-high rates of rotation, is small in size, durable and easily manufactured.

In accordance with the invention, the rotation rate of an object is measured by a fiber optic gyroscope which generates an alarm signal when the rotation rate of the object exceeds a predetermined threshold. The alarm signal is applied to a drive circuit which drives a phase modulator associated with the gyroscope. Different alarm signals are issued for different excessive rates of rotation which are measured by the gyroscope thereby resulting in a more severe modulation being performed by the phase modulator.

The drive signals from the drive circuit direct the phase modulator to offset Sagnac phase shifts which occur when the rotation speed of the object reach certain thresholds. The offsetting phase shifts allow for accurate measurements to occur on the interference curve and, as such, allow for the gyroscope to produce accurate measurements when the object is rotating at high rates.

In accordance with one embodiment of the invention, a fiber optic gyroscope for measuring a rotation rate of an object is disclosed where the gyroscope comprises: a light source means for generating a light beam; a bidirectional coupling means for receiving and forwarding the light beam generated by the light source means; a splitting means, which receives the light beam forwarded from the coupling means, for splitting the light beam into a first beam and a second beam; a fiber optic sense means for receiving the first and second beams; a phase modulator means for adjusting the phase of the first and second beams; a detector means for detecting the intensity of the first and second beams; a signal processor means for determining the rotation rate of the gyroscope based on the intensity detected by the detector means and for issuing an alarm when the measured rotation speed of the gyroscope produces a phase shift which exceeds a predetermined threshold; and, a drive circuit means for driving the phase modulator means to adjust the phases of the first and second beams when the signal processor issues an alarm.

In accordance with another aspect of this embodiment of the invention, the drive circuit means further comprises: a phase modulation drive circuit for producing a first drive signal; a bias modulation drive circuit for producing a second drive signal; and, a summing amplifier, which receives said first drive signal and said second drive signal, and produces a third drive signal which is used to drive the phase modulator.

In accordance with another embodiment of the invention a method for measuring the rotation rate of an object is disclosed where the method comprising the steps of: (i) generating a light beam; (ii) splitting the light beam into a first beam and a second beam; (iii) passing the first beam through a fiber optic coil and then through a phase modulator while simultaneously passing the second beam through the phase modulator and then through a fiber optic coil; (iv) recombining the first and second beams; (v) calculating the rotation rate of an object based on the recombined beam; and (vi) adjusting the phase modulator by a predetermined amount when the rotation rate produces a phase shift which exceeds a predetermined threshold.

In accordance with another embodiment of this invention, a fiber optic gyroscope for measuring the rotation rate of an object based on a beam of light that has been recombined from two beams which travel in opposite directions around a fiber optic coil and which pass through a phase modulator is disclosed, where the gyroscope comprises: means for determining the rotation speed of the object based on the recombined beam and for issuing an alarm signal if the rotation speed exceeds a predetermined threshold; and, means responsive to the alarm signal for applying a drive signal to the phase modulator to adjust the phases of the two beams.

In accordance with another aspect of this embodiment of the invention, the determining means issues a first alarm for a rotation speed in excess of a first threshold and a second alarm for a rotation speed in excess of a second threshold.

In accordance with yet another aspect of this embodiment of the invention, the means for applying a drive signal applies a first magnitude signal in response to the first alarm and a second magnitude signal in response to the second alarm.

In accordance with even another embodiment of the invention, a method for modifying the phase of light beams used to measure the rotation rate of an object is disclosed, where the method comprises the steps of: (i) issuing an alarm signal when the object has a rotation speed which exceeds a predetermined threshold; and, (ii) adjusting the phase of the light beams in response to the alarm signal.

BRIEF DESCRIPTION OF THE DRAWINGS

The accompanying drawings are included to provide an understanding of the invention and constitute a part of the specification.

DESCRIPTION OF THE INVENTION

Figure 1:
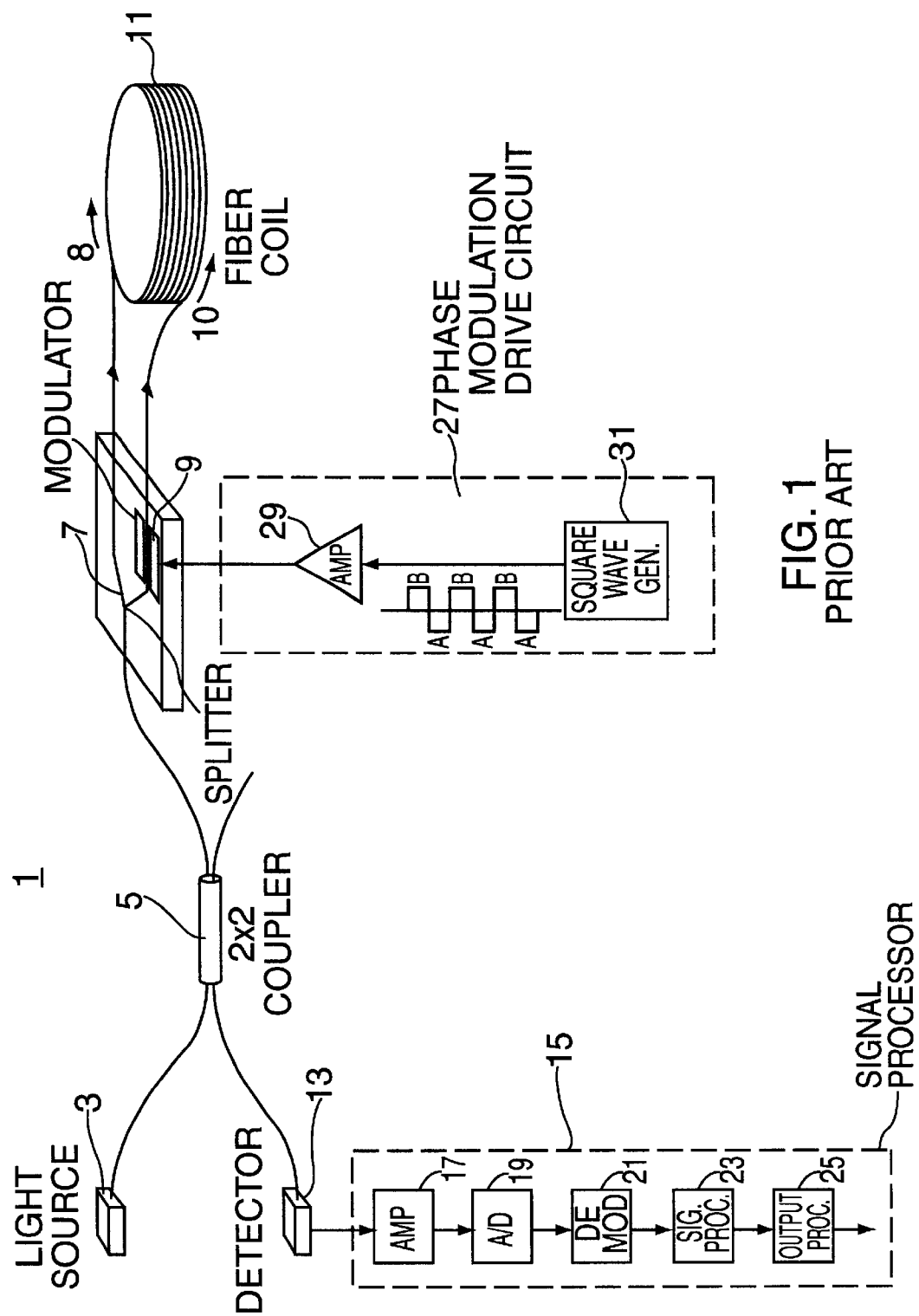
FIG. 1 illustrates a conventional fiber optic gyroscope.
Figure 2:
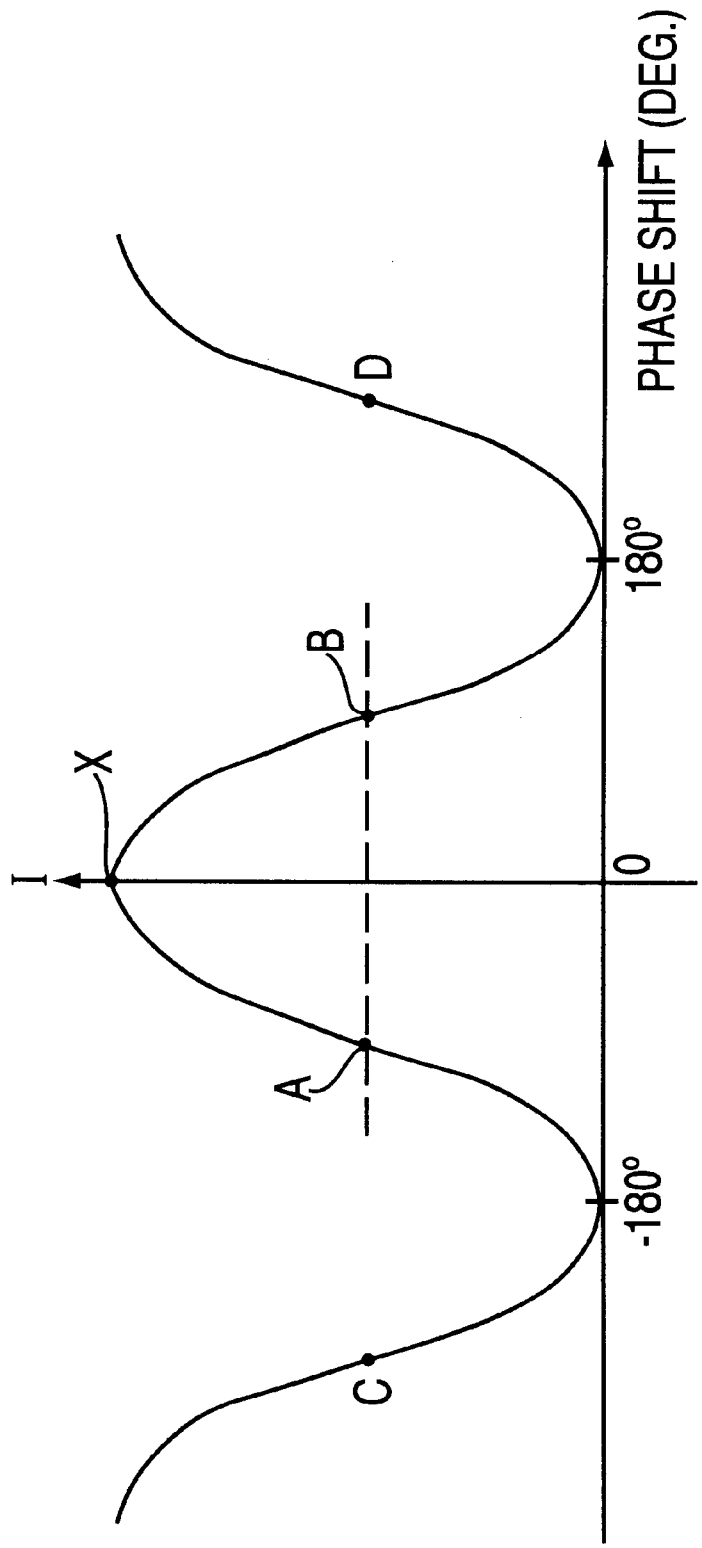
FIG. 2 illustrates an interference curve which correlates the intensity of recombined beams produced by the gyroscope shown in FIG. 1 to the phase difference between the beams; and, FIG. 3 illustrates a fiber optic gyroscope developed in accordance with the present invention.
Figure 3:
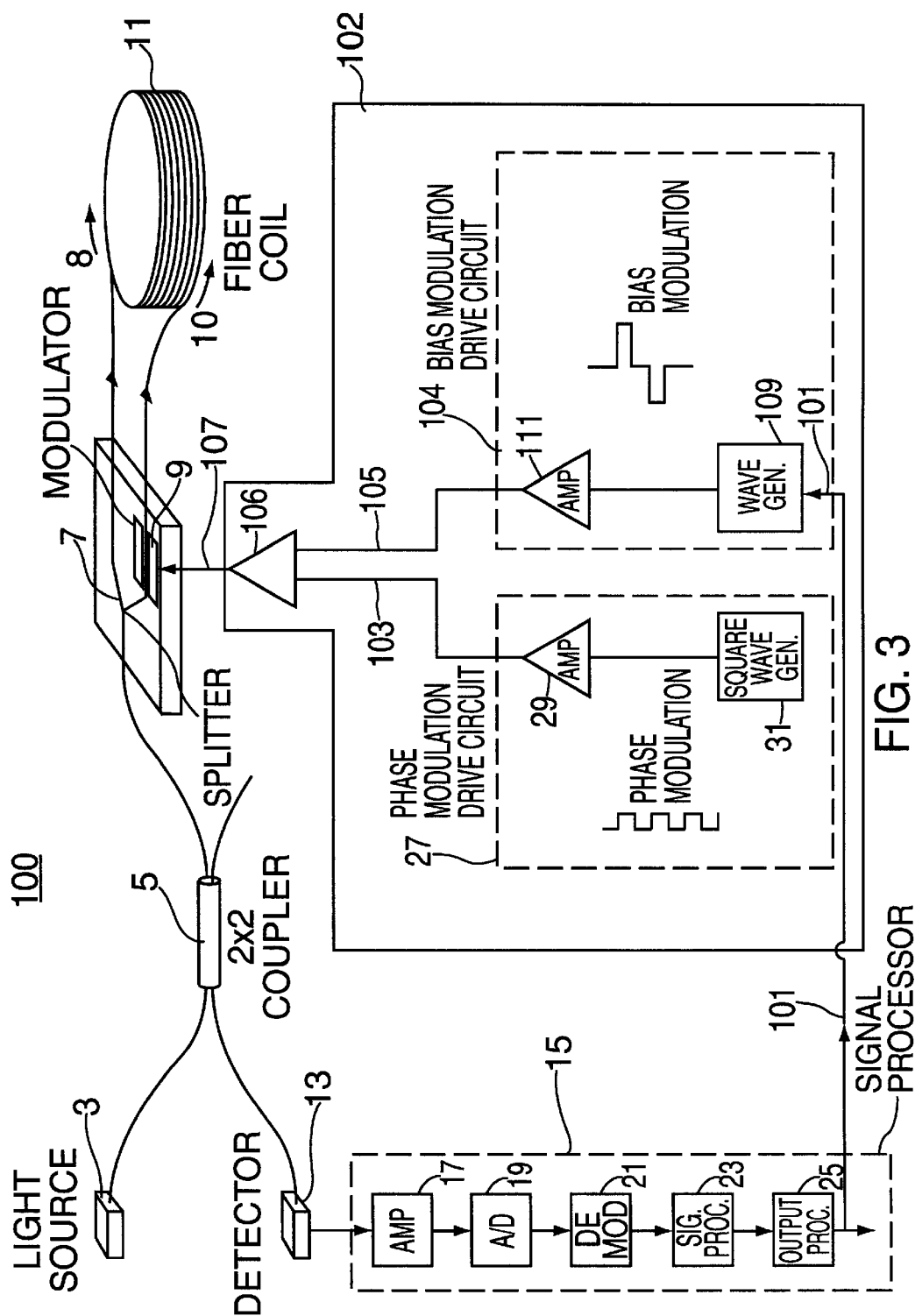

FIG. 3 shows a fiber optic gyroscope 100 developed in accordance with the present invention. As is described in detail below, the gyroscope 100 is designed to adjust the phases of the first and second beams 8 and 10 if the rotation rate of the gyroscope exceeds certain thresholds and, as such, allow for accurate measurements to occur at high rates of rotation.

The signal processor 15 of the gyroscope 100, unlike the conventional gyroscope, implements various rotation thresholds which, if exceeded, trip an alarm. For example, when the output processor 25 of the signal processor 15 shown in FIG. 3 detects a rotation speed which produces a Sagnac phase shift in excess of a predetermined amount, an alarm is tripped. The alarm indicates that the phase shift is too large to allow for accurate measurements to occur on the interference curve.

To remove the errors that are invariably caused by such large rate induced phase shifts, the output processor 25 sends a signal 101 to a bias modulation drive circuit 104. Based on the signal 101, the bias modulation drive circuit 104 generates bias modulation drive signal 105 to adjust the phases of beams 8 and 10 to overcome the problems with conventional gyroscopes and ensure that the phase of the beams will be measured on linear region of the interference curve.

It is important to point out that the output processor 25 developed in accordance with the present invention can have more than one alarm threshold. For example, in the scenario described above, the output processor 25 will issue a first alarm when the rotation speed of the gyroscope 100 produces a Sagnac phase shift in the range of 30°–90°. This first alarm will result in specific bias modulation being performed by the bias modulation drive circuit 104.

The output processor 25 will also issue a second alarm if and when the rotation of the gyroscope 100 produces a Sagnac phase shift which is approximately twice that of the first Sagnac phase shift detected which produced the first alarm. This second alarm will result is a different and more severe bias modulation being performed by the bias modulation drive circuit 104.

The output processor 25 will continue to issue series of alarms for each rotation rate increment which falls outside of a predetermined range. Each alarm will result in a different bias modulation being performed by the bias modulation circuit 104. The threshold for each alarm can of course be changed based on the size, scope and design of each gyroscope developed in accordance with present invention.

The gyroscope 100 developed in accordance with the present invention also includes an drive circuit 102 which is used for driving the phase modulator 9 based on the alarms issued by the signal processor 15. The drive circuit 102 contains many components.

One component of the drive circuit 102 is a phase modulation drive circuit 27 which produces a phase modulation drive signal 103. The phase modulation drive circuit 27 includes a square wave generator 31 and an amplifier 29. The phase modulation drive signal 103 performs the known function of modulating the phase of the beams 8 and 10 to allow measurements to occur at points A and B on the interference curve.

Another component of the drive circuit 102 is bias modulation drive circuit 104 which produces a bias modulation drive signal 105. The bias modulation drive circuit 104 includes a wave generator 109 and amplifier 111. The bias modulation drive signal 105, as was discussed above and unlike conventional devices, further adjusts the phases of beams 8 and 10 depending on the rotational speed of the gyroscope. It is this additional adjustment to the phase that eliminates the errors in caused by large rate induced phase shifts.

Another component of the drive circuit 102 is summing amplifier 106. The amplifier 106 receives the first and second drive signals 103 and 105 and sums the signals to produces a third drive signal 107. The third drive signal 107 is then used to drive the phase modulator 9.

The present invention is not to be considered limited in scope by the preferred embodiments described in the specification. For example, while the invention described herein is used in a fiber optic gyroscope, the invention can be used in any type of interferometer that is used for measuring rotation rates and is susceptible to operational errors due to rate induced phase shifts. Also, while the phase modulation drive circuit described herein uses a square wave generator, this circuit can also use a sign wave generator. Additional advantages and modifications, which will readily occur to those skilled in the art from consideration of the specification and practice of the invention, are intended to be within the scope and spirit of the following claims.

We claim:

1. A fiber optic gyroscope for measuring an ultra-high rotation rate of an object, said gyroscope comprising:
    a light source means for generating a beam of light;
    a bidirectional coupling means for receiving and forwarding the light beam generated by the light source means;
    a splitting means, which receives the light beam forwarded from the coupling means, for splitting the light beam into a first and a second beam;
    a fiber optic sense means for receiving the first and second beams;
    a phase modulator means for adjusting the phase of the first and second beams;
    a detector means for detecting the intensity of the first and second beams;
    a signal processing means for determining the rotation rate of the gyroscope based on the intensity detected by the detector means and for issuing an alarm signal, when the measured rotation speed of the gyroscope produces a phase shift responsive to the measured rotation speed exceeding a predetermined high speed threshold; and,
    a drive circuit means for driving the phase modulator means to adjust the phases of the first and second beams when the signal processor issues an alarm.

2. The fiber optic gyroscope of claim 1, wherein said drive circuit means further comprises:
    a phase modulation drive circuit for producing a first drive signal;
    a bias modulation drive circuit for producing a second drive signal; and,
    a summing amplifier, which receives said first drive signal and said second drive signal, and produces a third drive signal which is used to drive the phase modulator.

3. The fiber optic gyroscope of claim 2, wherein said phase modulation drive circuit further includes a square wave generator and an amplifier.

4. The fiber optic gyroscope of claim 3, wherein said square wave generator provides a modulation offset voltage such that the gyroscope signals can work on the zero fringe under ultra-high rate conditions.

5. The fiber optic gyroscope of claim 3, wherein said square wave generator generates a modulated square wave signal.

6. The fiber optic gyroscope of claim 5, wherein said predetermined high speed threshold is based on a mathematical algorithm which computes the difference between the two phases of said square wave signal and a tracking algorithm.

7. The fiber optic gyroscope of claim 2, wherein said bias modulation drive circuit further includes a wave generator and an amplifier.

8. A fiber optic gyroscope for measuring the ultra-high rotation rate of an object based on a beam of light that has been recombined from two beams which travel in opposite directions around a fiber optic coil and which pass through a phase modulator, said gyroscope comprising:
    means for determining the rotation speed of the object based on the recombined beam and for issuing an alarm signal if the rotation speed exceeds a predetermined high speed threshold; and,
    means responsive to said alarm signal for applying a drive signal to said phase modulator to adjust the phases of the two beams.

9. A fiber optic gyroscope for measuring the rate of an object based on a beam of light that has been recombined from two beams which travel in opposite directions around a fiber optic coil and which pass through a phase modulator, said gyroscope comprising:
    means for determining the rotation speed of the object based on the recombined beam and for issuing an alarm signal if the rotation speed exceeds a predetermined threshold;
    means responsive to said alarm signal for applying a drive signal to said phase modulator to adjust the phases of the two beams; and,
    wherein said determining means issues a first alarm for a rotation speed in excess of a first threshold and a second alarm for a rotation speed in excess of a second threshold.

10. The fiber optic gyroscope according to claim 9, wherein said means for applying a drive signal applies a first magnitude signal in response to said first alarm and a second magnitude signal in response to said second alarm.

11. A method for measuring the rotation speed of an object having an ultra-high rate of rotation, said method comprising the steps of:

generating a light beam;

splitting the light beam into a first beam and a second beam;

passing the first and second beams through a phase modulator and in opposite directions around a fiber optic coil;

recombining the first and second beams;

calculating the rotation rate of the object based on the recombined beam and issuing an alarm signal when said object has a rotation speed which exceeds a predetermined high speed threshold; and, adjusting the phase modulator to adjust the phase of the light beams by a predetermined amount in response to said alarm signal.

12. The method in accordance with claim 11 further comprising the steps of issuing a second alarm signal when said object has a rotation speed which exceeds a second predetermined high speed threshold; and adjusting the phase modulator to adjust the phase of the light beams by a second predetermined amount in response to said second alarm signal.

13. A fiber optic gyroscope for measuring an ultra-high rotation rate of an object, said gyroscope comprising:

a light source for generating a beam of light;

a bidirectional coupler for receiving and forwarding the light beam generated by the light source;

a splitter, which receives the light beam forwarded from the coupler, for splitting the light beam into a first and a second beam;

a fiber optic sensor for receiving the first and second beams;

a phase modulator for adjusting the phase of the first and second beams;

a detector for detecting the intensity of the first and second beams;

a signal processor for determining the rotation rate of the gyroscope based on the intensity detected by the detector and for issuing an alarm signal, when the measured rotation speed of the gyroscope produces a phase shift responsive to the measured rotation speed exceeding a predetermined high speed threshold; and, a drive circuit for driving the phase modulator to adjust the phases of the first and second beams when the signal processor issues an alarm.

* * * * *